United States Patent [19]

Sakaue

[11] Patent Number: 5,043,550
[45] Date of Patent: Aug. 27, 1991

[54] WIRE CUT ELECTRIC DISCHARGE MACHINE

[75] Inventor: Makoto Sakaue, Aichi, Japan

[73] Assignee: Mitsubishi Denki K.K., Tokyo, Japan

[21] Appl. No.: 301,290

[22] Filed: Jan. 25, 1989

[30] Foreign Application Priority Data

Jan. 25, 1988 [JP] Japan ................... 63-14102

[51] Int. Cl.⁵ ............................. B23H 7/06; B23H 7/20
[52] U.S. Cl. ................................. 219/69.12; 219/69.17;
364/474.04; 364/474.14
[58] Field of Search ............... 219/69.12, 69.13, 69.17;
364/474.04, 474.14

[56] References Cited

U.S. PATENT DOCUMENTS

| | | | |
|---|---|---|---|
| 4,544,819 | 10/1985 | Nomura et al. | 219/69.17 |
| 4,559,434 | 12/1985 | Kinoshita | 219/69.17 |
| 4,746,782 | 5/1988 | Weber | 219/69.17 |

FOREIGN PATENT DOCUMENTS

| | | | |
|---|---|---|---|
| 0059639 | 9/1982 | European Pat. Off. . | |
| 0134910 | 3/1985 | European Pat. Off. . | |
| 3509418 | 3/1987 | Fed. Rep. of Germany . | |
| 56-76343 | 6/1981 | Japan | 219/69.12 |
| 102426 | 8/1981 | Japan . | |
| 61-3614 | 2/1986 | Japan . | |
| 293724 | 12/1986 | Japan | 219/69.17 |

*Primary Examiner*—Geoffrey S. Evans
*Attorney, Agent, or Firm*—Sughrue, Mion, Zinn, Macpeak & Seas

[57] ABSTRACT

A wire cut electric discharge machine which uses an NC program which can be executed without concerning how much the cutting locus is left unmachined, to perform a cut leaving operation and a cut completing operation. The wire cut electric discharge machine is capable of machining a plurality of parts continuously from a single workpiece with a single NC program.

7 Claims, 4 Drawing Sheets (a) CUT LEAVING NC PROGRAM (b) CUT COMPLETING PROGRAM

WIRE CUT ELECTRIC DISCHARGE MACHINE

BACKGROUND OF THE INVENTION

This invention relates to an electric discharge machine using a wire electrode.

A conventional electric discharge machine of this type is as shown in FIG. 5. In FIG. 5, reference numeral 12 designates a workpiece to be machined; 10, a movable table on which a workpiece is placed; 16 and 20, sliding members; 14 and 18, driving means for moving the sliding members 16 and 20, namely, servo motors; 22, a numerical control device for applying signals to the servo motors 14 and 18; 24, a machining wire electrode; 30 and 32, wire guides for supporting the machining wire electrode 24; 26, a wire bobbin on which the wire electrode 24 has been wound; 36, tension rollers for winding the wire electrode 24; 38, a wire take-up roller on which the wire electrode used is wound; 28 and 34, voltage applying elements for applying voltage across the wire electrode 24 and the workpiece 12; 40, an electric power supply unit for supplying the voltage; 42, a DC source; 44, a switching transistor for switching on and off the DC source 42 to provide a pulse voltage; 50, a control unit for controlling the operation of the switching transistor 44; 48, a limit resistor; 46, a charging capacitor; 52, a machining solution device; 56, a machining solution tank in which a machining solution is stored; 58, a filter for the machining solution; 60, a pump for pumping out the machining solution; 62, a nozzle for supplying the machining solution to the workpiece; 54, the machining solution serving as a discharge medium between the workpiece 12 and the wire electrode 24; and 70, an automatic wire electrode feeding device capable for cutting and connecting the wire electrode 24.

The operation of the electric discharge machine thus organized will be described with reference to FIG. 5.

The workpiece 12 is fixedly set on the movable table 10. The movable table 10 is moved in the X-axis direction by the servo motor 14 and in the Y-axis direction by the servo motor 18 under the control of the numerical control device 22; that is, the movable table 10 is positioned by the servo motors 14 and 18. The pulse voltage V which is converted from the output voltage of the DC source 42 with the aid of the switching transistor 44 and the charging capacitor 46 in the power supply unit 40, is applied through the feeders 28 and 34 to the wire electrode 24. On the other hand, the machining solution 54 passing through the filter 58 in the machining solution supplying device is pumped out of the machining solution tank 56 and applied, as a discharge medium, between the workpiece 12 and the wire electrode 24.

As a result, electric discharge occurs between the wire electrode 24 and the workpiece 12, thus producing heat in the latter. Therefore, as the wire electrode 24 and the workpiece 12 are moved relative to each other by means of the numerical control device 22, the workpiece 12 is machined as required.

A plurality of parts (configurations) may be formed by machining one workpiece 12 with the automatic wire electrode supplying device 70 as follows: As shown in FIG. 6, at each of initial holes 1 through 8, the automatic wire electrode supplying device 70 is operated to automatically connect the wire electrode 24, and a workpiece cutting operation is started. In this case, an NC program is executed as shown in the part (a) of FIG. 7. That is, slightly before the part is completely cut out of the workpiece; i.e., when the cutting of the workpiece has been not yet completed so that the part may not be dropped from the workpiece, the automatic wire electrode supplying device 70 is operated to cut the wire electrode 24 with a cut-left portion, and the same cutting operation is then carried out from the following initial hole. Thus, the unmanned cutting operation can be continuously carried out.

Upon completion of the series of cutting operations, an NC program as shown in the part (b) of FIG. 7 is executed to machine the remaining parts of the cutting loci.

In the part (a) of FIG. 7, reference character M21 designates a wire electrode cutting instruction. In response to the instruction M21, the discharge machining operation is suspended. In the part (b) of FIG. 7, reference character M0 designate a program stop instruction. In response to the instruction M0, the machining of the remaining part of the cutting locus which the cut-leaving NC program has left so as to be machined later (hereinafter referred to as "a cut-left", when applicable) is suspended. In the parts (a) and (b) of FIG. 7, the solid lines indicate what are cut by electrodischarge machining.

The conventional wire cut discharge machine is constituted as described above. Therefore, in the case where a plurality of parts are successively cut out of a workpiece as shown in FIG. 6, it is necessary to use two NC programs such as a cut leaving NC program as shown in the part (a) of FIG. 7 and a cut completing NC program as shown in the part (b) of FIG. 7. It takes time to form the two NC programs, and it is necessary to store the NC programs in the numerical control device. That is, the conventional discharge machine is low in work efficiency. In addition, it may suffer from a difficulty that the memory is not effectively utilized.

SUMMARY OF THE INVENTION

Accordingly, an object of this invention is to eliminate the above described difficulties accompanying a conventional wire cut discharge machine. More specifically, an object of the invention is to provide a wire cut electric discharge machine which uses an NC program which can be executed without concerning how much the cutting locus is left unmachined, to perform a cut leaving operation and a cut completing operation.

In a wire cut electric discharge machine of the present invention, referring to a predetermined program stop instruction, a numerical control device selectively effects a cut leaving mode and a cut completing mode so that a cut leaving operation and a cut completing operation are automatically carried out. More specifically, in a wire cut electric discharge machine with a numerical control device for controlling an automatic wire electrode supplying device, drive means for controlling the relative position of the wire electrode and the workpiece and a discharging voltage, an NC program provided for the numerical control device is able to selectively effect a cut leaving mode in which, when an amount of cut-left becomes equal to a predetermined value during the machining of a workpiece the wire electrode is automatically cut, and a cut completing mode in which, when, after the workpiece being moved along a configuration formed in the cut leaving mode according to the same program as in the cut leaving mode where, the program stop instruction has been given, a remaining movement distance becomes equal to the predetermined amount of cut-left, an electric discharge machining operation is automatically started to cut the remaining cut-left portion of the workpiece and then stopped at the initial hole.

BRIEF DESCRIPTION OF THE DRAWINGS

In the accompanying drawings;

FIG. 1 is an explanatory diagram for a description of an NC program employed in the electric discharge machine of the invention, FIG. 2 is an explanatory diagram for a description of one example of the NC program, FIG. 3 is an explanatory diagram for a description of a cut leaving mode in the electric discharge machine of the invention, and FIG. 4 is an explanatory diagram for a description of a cut completing mode therein.

FIG. 5 is an explanatory diagram showing the entire arrangement of the conventional wire cut electric discharge machine, FIG. 6 is a plan view for a description of the machining of a workpiece to cut a plurality of parts out of the single workpiece and the parts (a) and (b) of FIG. 7 are explanatory diagrams for a description of a cut leaving NC program and a cut completing program.

EMBODIMENT OF THE INVENTION

An embodiment of the present invention will be described with reference to the accompanying drawings.

Figure 1:
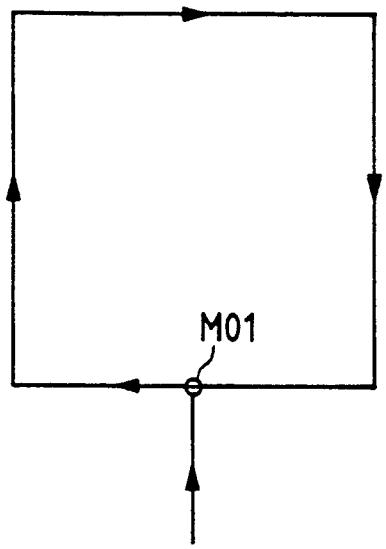
FIGS. 1 through 4 show one example of a wire cut electric discharge machining operation according to the present invention. More specifically.
Figure 2:
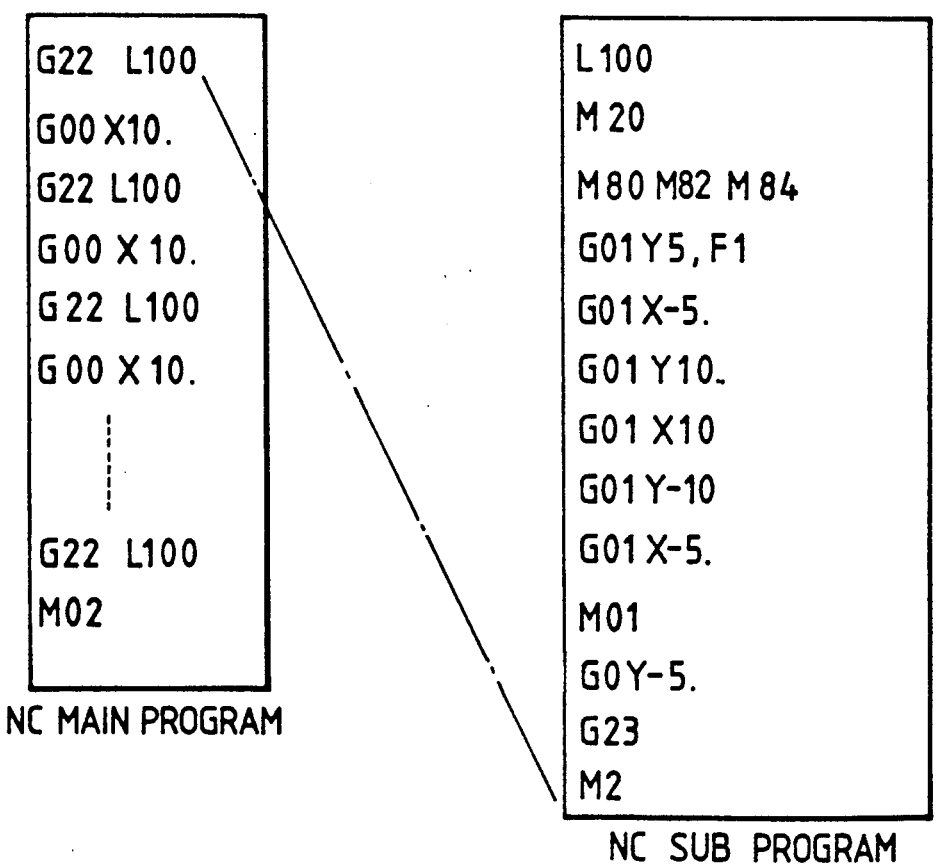
Figure 5:
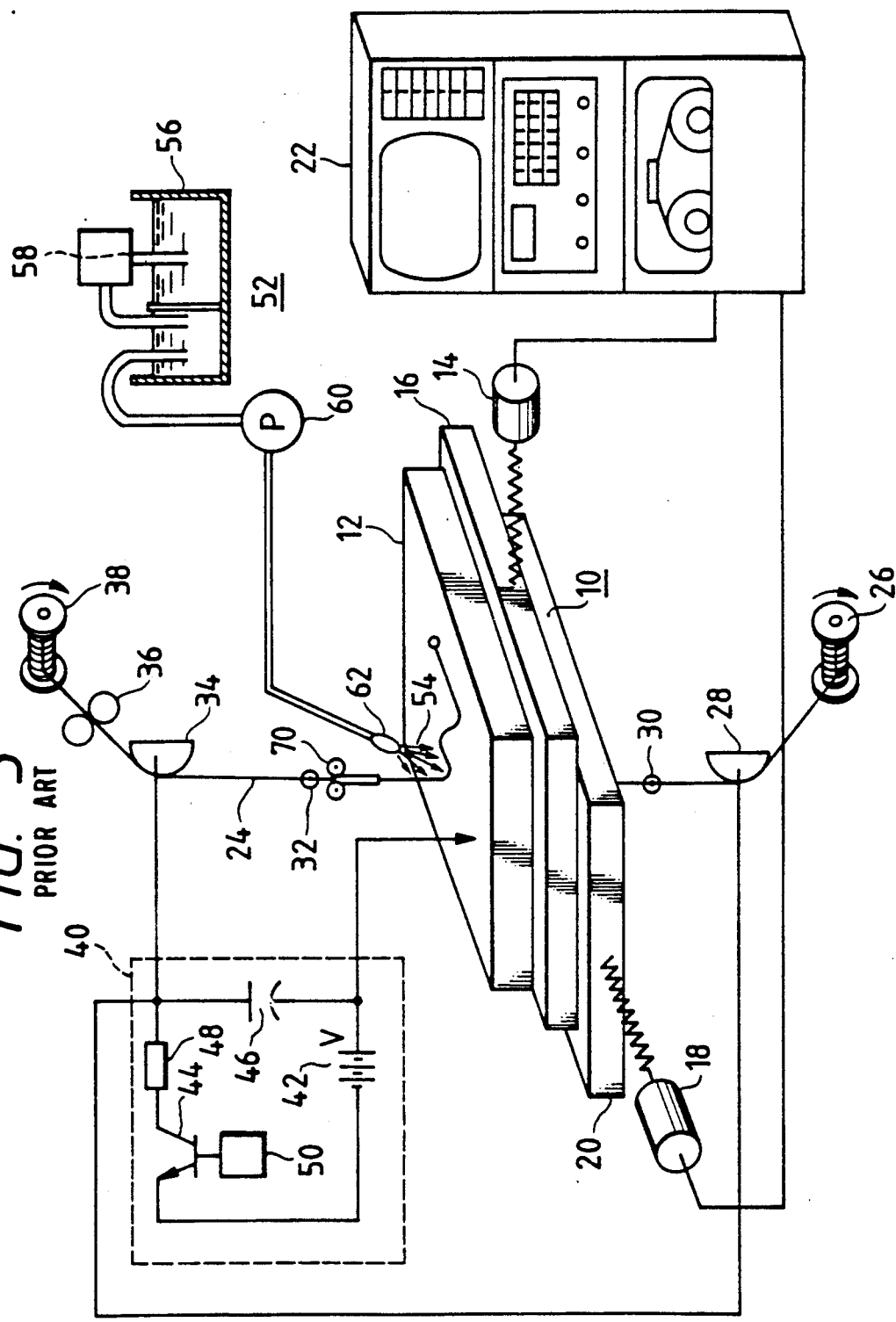
FIGS. 5, 6 and 7 show a conventional wire cut electric discharge machine. More specifically.
Figure 6:
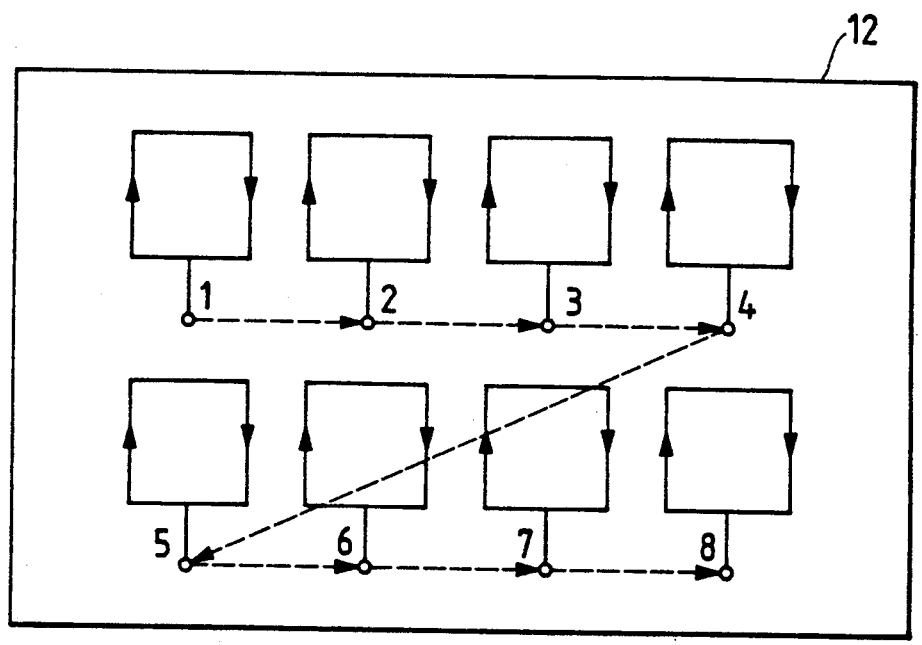

FIG. 6 is a diagram for a description of an operation of continuously machining a workpiece to have a plurality of parts cut out of the single workpiece. FIG. 2 is a diagram showing one example of an NC program to operate the wire cut electric discharge machine shown in FIG. 5. In FIG. 2, "G22 L100" is an instruction for reading and performing the NC program of label number 100; "G00X10", an instruction for movement +10.0 mm in the X-axis direction; "M20", an instruction for causing the automatic wire electrode supplying device 70 to connect the wire electrode 24; "M80", "M82" and "M84", instructions for effecting the supplying of the machining solution, the feeding of the wire electrode and the starting of the discharge machining operation, respectively; "G01", an instruction for movement at a speed F specified by X and Y; and "M01", an optional stop instruction for stopping the program when effective in the numerical control device 22. The instruction "M01" is inserted in the NC program as shown in FIG. 1.

Figure 3:
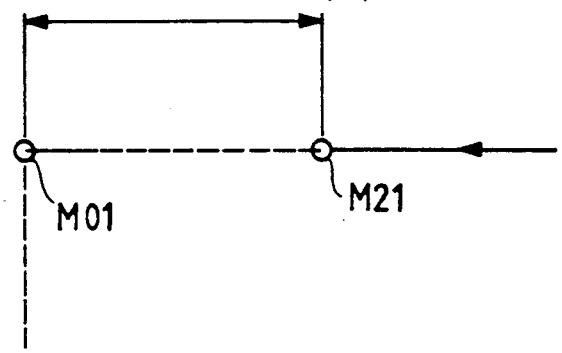
Figure 4:
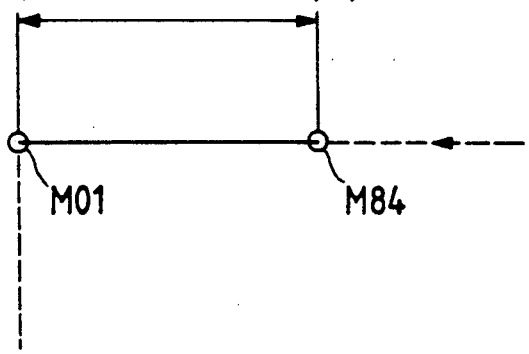

FIG. 3 is an explanatory diagram for a description of a cut leaving operation (or cut leaving mode), and FIG. 4 is an explanatory diagram for a description of a cut completing operation (or cut completing mode). The remaining arrangement is the same as that in the above-described conventional electric discharge machine.

The operation of the wire cut electric discharge machine will be described.

Figure 7:
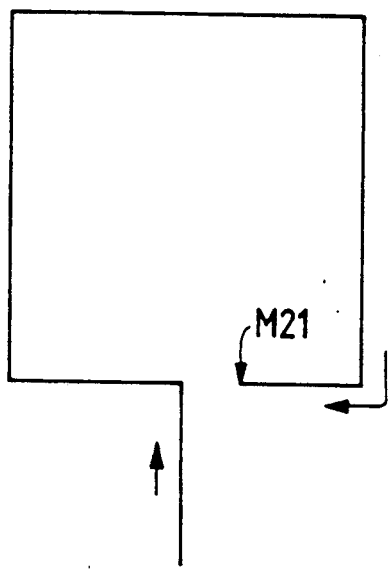
Figure 7:
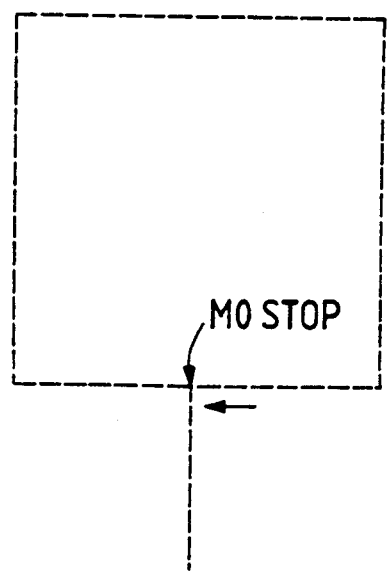

In the case where the NC program as shown in FIG. 2 is used to machine the workpiece to have a plurality of parts cut out of the single workpiece as shown in FIG. 6, first the cutting of each of the parts is left half-done; that is, each part has a cut-left. In this case, in the numerical control device, the cut leaving mode is selected, and an amount of cut-left is determined. When, under this condition, the electric discharge machine is started in response to the instruction M20, the wire electrode 24 is connected first through the initial hole, and the discharge machining operation is effected; that is, machining the workpiece is started. Next when, while a machining step of "G01X-5" whose step is of the instruction M01 is being machined as shown in FIG. 3, the amount of cut-left becomes equal to that (L) set to the numerical control device 22 in advance, in response to the instruction M21 the numerical control device 22 operates so that the wire electrode 24 is automatically cut, and the workpiece is moved by the movable table 10 until provision of the instruction M20. By performing this operation repeatedly, the configurations equal to that which has been obtained with the cut leaving NC program as shown in the part (a) of FIG. 7 are successively cut in the workpiece 12 in FIG. 6.

Thereafter, the movable table 10 is returned to the first initial hole 1. With the numerical control device, the cut completing mode is selected, and the optional stop instruction M01 is made effective. Under this condition, the electric discharge machine is started. In the cut completing mode, the discharge machining operation start instruction M84 shown in FIG. 2 being disregarded, the movement is made along the configuration at a predetermined speed which has been obtained by discharge machining according to the cut leaving NC program. When, while the machining step of "G01X-5" whose next block is of "M01" is being moved, the remaining movement distance becomes equal to the amount of cut-left (L) set in the numerical control device 22, the latter 22 is operated so that the discharge machining operation start (ON) is automatically carried out with the instruction M84, and the cut-left of the workpiece 12 is machined as shown in FIG. 4 to allow the part to drop down. Then, in response to the optional stop instruction M01, the NC program is suspended. After removing the part thus dropped, the operator starts the machining operation again, to achieve the cut completing operation of the following configuration. By performing the above-described operation repeatedly, the same operation as that with the cut completing NC program shown in FIG. 7 can be achieved.

With the above-described embodiment, in the cut completing mode, only the instruction M48 is disregarded. However, depending on a machining configuration, the machining conditions may be set tolerant, so that, while being subjected to electric discharge machining, the workpiece is moved along the cutting path formed, according to the cut leaving NC program. This will eliminate such a difficulty that, before reaching the final point where the part is allowed to drop from the workpiece, the wire electrode might be caught and broken.

In the above-described embodiment, the cut leaving operation and the cut completing operation are carried out individually. However, these operations can be carried out automatically continuously, provided that means for automatically removing the parts dropped is provided.

EFFECTS OF THE INVENTION

As is apparent from the above description, according to the invention, machining a workpiece to cut a plurality of parts out of a single workpiece can be achieved with only one NC program. Therefore, in forming the NC program, it is unnecessary to take the amount of cut-left into account, and accordingly the NC program can be formed with ease, and it can be realized with relatively small capacity. This will greatly contribute the improvement of the wire cut electric discharge machine.

What is claimed is:

1. A wire cut electric discharge machine comprising: an automatic wire electrode supplying device for automatically cutting and supplying a wire electrode; drive means for controlling the relative position between said wire electrode and a workpiece; a power supply unit for applying a discharging voltage across said wire electrode and said workpiece; and a numerical control device for controlling said power supply unit, said automatic wire electrode supplying device and said drive means performing according to an NC program, said NC program being able to selectively effect a cut leaving mode in which an electric discharge machining operation is carried out while moving said wire electrode and workpiece relative to one another along a cutting path and, when an amount left to be cut along said cutting path becomes equal to a predetermined value, said wire electrode is automatically cut, and a cut completing mode in which said wire electrode and workpiece are moved relative to one another along said cutting path and, when a remaining movement distance becomes equal to said predetermined amount left to be cut, an electric discharge machining operation is automatically started to cut a part of said workpiece which is left in said cut leaving mode.

2. A wire cut electric discharge machine as claimed in claim 1, wherein said cut leaving mode is performed according to a single NC program and cutting is stopped in response to a first machine instruction and wherein said cut completing mode is performed according to said single NC program and cutting is started in response to a second machine instruction provided during movement of said wire electrode relative to said workpiece during said cut completing mode.

3. A wire cut electric discharge machine as claimed in claim 1, wherein said cut leaving mode and said cut completing mode are performed using the same computer program operating in a first mode or a second mode, respectively.

4. A method for cutting a plurality of holes in a workpiece using a wire electrode comprising the steps of:
    (a) cutting a first portion of a first of said holes to be cut in said workpiece, said first portion being less than an entire portion of said first hold to be cut;
    (b) cutting said wire electrode when said first portion has been cut in said workpiece;
    (c) repeating steps (a) and (b) for each of the remaining holes;
    (d) moving said wire electrode over the first portion of said first hole without cutting said workpiece;
    (e) cutting a second portion of said first hole, wherein the sum of said first portion and said second portion is equal to the entire portion to be cut for the first hole; and
    (f) repeating steps (d) and (e) for each of the remaining holes.

5. A method as claimed in claim 4, wherein step (a) through (c) and steps (d) through (f) are performed using the same computer program operating in a firs mode or a second mode, respectively.

6. A method of machining a workpiece using a wire electrode, said method comprising the steps of:
    cutting a cutting path in a cut leaving mode according to a computer program by moving said wire electrode and said workpiece relative to one another along said cutting path;
    stopping said cutting step in response to a first machining instruction provided prior to cutting of an entire part to be cut and leaving a remaining portion of said part to be cut;
    moving said wire electrode and said workpiece relative to each other along said cutting path without cutting said workpiece according to said computer program; and
    cutting said remaining portion of said part to be cut in response to a second machining instruction provided during said moving step.

7. A method of machining a workpiece using a wire electrode as claimed in claim 6, wherein said cutting steps are performed using said computer program operating in a first mode or a second mode, respectively.

* * * * *